(12) United States Patent
Sun

(10) Patent No.: US 9,125,207 B2
(45) Date of Patent: Sep. 1, 2015

(54) METHOD AND DEVICE FOR CONTROLLING CHANNEL TRANSMISSION

(75) Inventor: Changjiang Sun, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 414 days.

(21) Appl. No.: 13/642,515

(22) PCT Filed: Dec. 20, 2010

(86) PCT No.: PCT/CN2010/080011
§ 371 (c)(1),
(2), (4) Date: Oct. 19, 2012

(87) PCT Pub. No.: WO2011/140808
PCT Pub. Date: Nov. 17, 2011

(65) Prior Publication Data
US 2013/0039322 A1 Feb. 14, 2013

(30) Foreign Application Priority Data
May 12, 2010 (CN) .......................... 2010 1 0178358

(51) Int. Cl.
H04W 76/04 (2009.01)
H04W 8/04 (2009.01)
H04W 72/08 (2009.01)

(52) U.S. Cl.
CPC .............. *H04W 76/046* (2013.01); *H04W 8/04* (2013.01); *H04W 72/082* (2013.01)

(58) Field of Classification Search
None
See application file for complete search history.

(56) References Cited

U.S. PATENT DOCUMENTS

2010/0074182 A1* 3/2010 Shao .............................. 370/328

FOREIGN PATENT DOCUMENTS

| CN | 101605041 A | 12/2009 |
| CN | 101610543 A | 12/2009 |
| CN | 101651883 A | 2/2010 |

(Continued)

OTHER PUBLICATIONS

"3rd Generation Partnership Project; Technical Specification Group Radio Access Network; Radio Resource Control (RRC); Protocol specification (Release 9)". 3GPP Standard; 3GPP Ts 25.331.3RD Generation Partnership Project (3GPP). Mobile Competence Centre; 650. Route Des Lucioles ; F-06921 Sophia-Antipolis Cedex ; France. No. V9.2.1.29 Apr. 2010.*

(Continued)

*Primary Examiner* — Michael Thier
*Assistant Examiner* — Brian Cox
(74) *Attorney, Agent, or Firm* — Bright IP Law Offices

(57) ABSTRACT

The present invention discloses a method and device for controlling channel transmission. The control method includes: an MAC module receiving a resource configuration message; the MAC module parsing influence information from the resource configuration message, wherein the influence information indicates a radio bearer (RB) resource influenced by resource configuration; and during the resource configuration, the MAC module only pausing the data transmission borne by the RB resource influenced by the resource configuration. By way of the present invention, the RB resource not influenced by the resource configuration during the resource configuration can still carry out normal data transmission, avoiding the waste of RB resources not influenced by the resource configuration during the resource configuration.

9 Claims, 5 Drawing Sheets

(56) References Cited

FOREIGN PATENT DOCUMENTS

CN 101835267 A 9/2010
WO 2009123358 A1 10/2009

OTHER PUBLICATIONS

"3rd Generation Partnership Project; Technical Specification Group Radio Access Network; Radio Resource Control (RRC); Protocol specification (Release 9)". 3GPP Standard; 3GPP TS 25.331. 3rd Generation Partnership Project (3GPP). Mobile Competence Centre; 650. Route Des Lucioles ; F-06921 Sophia-Antipolis Cedex ; France. No. V9.2.1. Apr. 29, 2010. pages 1-1784. XP050441454. [retrieved on Apr. 29, 2010]* paragraph 8.2.2.2 paragraph 8.2.2.3 paragraph 10.2.27*.

EPO, Extended European Search Report for Application No. 10851312.8 dated Mar. 17, 2014.

P.R. China, State Intellectual Property Office, International Search Report for International Application No. PCT/CN2010/080011, mailed Mar. 24, 2011.

* cited by examiner

METHOD AND DEVICE FOR CONTROLLING CHANNEL TRANSMISSION

CROSS REFERENCE TO RELATED APPLICATIONS

This application is the U.S. National Stage of International Patent Application No. PCT/CN2010/080011 filed on Dec. 20, 2010, which claims priority to Chinese Patent Application No. 201010178358.5 filed on May 12, 2010 Both the PCT Application and Chinese Application are hereby incorporated by reference in their entirety.

FIELD OF THE INVENTION

The present invention relates to the field of mobile communication, and particularly, to a method and device for controlling channel transmission.

BACKGROUND OF THE INVENTION

The universal mobile telecommunications system (abbreviated, as UMTS) belongs to the $3^{rd}$ Generation mobile communication system, and in particular, the UMTS consists of core network (abbreviated as CN). UMTS terrestrial radio access network (abbreviated as UTRAN) and user equipment (abbreviated as UE).

In particular, the interface between the UTRAN and the UE is a Uu interface, and over the Uu interface, the protocol stacks can be divided according to the functions thereof into: physical layer (layer 1), data link layer (layer 2) and network layer (layer 3). In this case, layer 1 is the physical layer, layer 2 includes modules such as radio link control (abbreviated as RLC), packet data convergence protocol (abbreviated as PDCP), media access control (abbreviated, as MAC), etc.; and the radio resource control sub-layer is located at the lowest layer of layer 3, belonging to the access layer, which mainly provides functions such as the control and management of the radio resources.

The UTRAN sends resource configuration messages to the radio resource controller (abbreviated as RRC) at the UE side via the Uu interface, and these resource configuration messages mainly include three types: radio bearer (abbreviated as RB) resource, transport channel (abbreviated as TrCH) resource and physical channel (abbreviated as PhyCH) resource, wherein the radio bearer resource consists of a logical channel (abbreviated as LogCH), a transport channel and a physical channel. In particular, the UTRAN establishes a channel for transmitting data and signaling between the UE and the network side by sending resource configuration to the RRC at the UE side. The RB is a channel for the UE and the equivalent layer 2 of UTRAN to provide service, including service RB and signaling RB, each RB includes one or two logical channels, the TrCH is between the RB and the PhyCH, the MAC is the mapping from the LogCH to the TrCH, the physical layer is the mapping from the TrCH to the PhyCH, and the LogCH is between the RLC and the MAC.

The resource configuration of the RRC in the connected state includes: establishment, reconfiguration and release of the RB; establishment, reconfiguration and release of the TrCH; and establishment, reconfiguration and release of the PhyCH.

However, the inventors have found in the related art that during the configuration update, the data transmission will be interrupted whether or not the channel is influenced, thus causing waste of channel resources, and affecting the transmission rate of relevant data.

SUMMARY OF THE INVENTION

One main object of the present invention is to provide a method and device for controlling channel transmission, for solving at least one of the above problems.

A method for controlling channel transmission is first provided according to one aspect of the present invention and includes: an MAC module receiving a resource configuration message; the MAC module parsing influence information from the resource configuration message, wherein the influence information indicates a radio bearer (RR) resource influenced by resource configuration; and during the resource configuration, the MAC module only pausing the data transmission borne by the RB resource influenced by the resource configuration.

A device for controlling channel transmission is also provided according to another aspect of the present invention and includes:

a receiving module configured to receive a resource configuration message;

a parse module configured to parse influence information from the resource configuration message, the influence information indicating a radio bearer (RB) resource influenced by resource configuration; and a pause module configured to during the resource configuration, only pause the data transmission borne by the RB resource influenced, by the resource configuration.

By way of the method and device for controlling channel transmission in the present invention, during the resource configuration, the device, for controlling channel transmission only pauses the data transmission borne by the RB resource influenced by the resource configuration according to the resource configuration message, so that the RB resource not influenced by the resource configuration during the resource configuration can still carry out normal data transmission, avoiding the waste of RB resources not influenced, by the resource configuration during the resource configuration,

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

Figure 1:
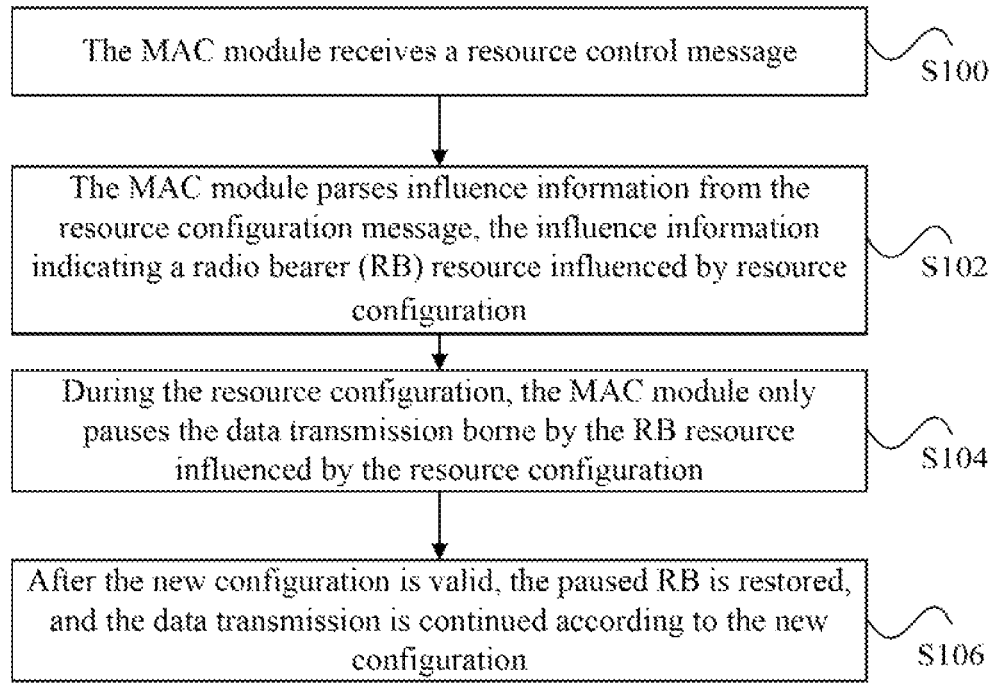
FIG. 1 is a flowchart of a method for controlling channel transmission according to the embodiments of the present invention.

The present invention will be described hereinafter in detail with reference to the accompanying drawings and in conjunction with embodiments. It needs to note that the embodiments of the present application and the features in the embodiments can be combined with each other if there is no conflict.

FIG. 1 is a flowchart of a method for controlling channel transmission according to the embodiments of the present invention, and as shown in FIG. 1, the above method for controlling channel transmission includes the following steps (steps S100 to S104):

at step S100, an MAC module receives a resource control message;

at step S102, the MAC module parses influence information from the resource configuration message, the influence information indicating an RB resource influenced by resource configuration;

at step S104, during the resource configuration, the MAC module only pauses the data transmission borne by the RB resource influenced by the resource configuration;

preferably, in order to avoid waste of channel resources after resource configuration, after the resource configuration is completed, the MAC module can also restore the paused data transmission borne by the RB resource, therefore, after step S104 is performed, the method can further include:

at step S106, after the new configuration is valid, the paused RB is restored, and the data transmission is continued according to the new configuration.

During the resource configuration in the related art, the data transmission of all the channels is stopped, such that a channel not influenced by resource configuration also interrupts its data transmission, causing waste of channel resources. However, in this embodiment, when the channel transmission is controlled, the RB resource influenced by resource configuration is determined according to the information carried by the resource configuration message, and only the data transmission of the RB resource influenced by resource configuration is paused during resource configuration, so that the other RB resources not influenced by resource configuration can still be transmitted normally, thus avoiding waste of channel resources during resource configuration, and improving user experience.

Preferably, the above resource configuration message can further include reconfiguration information, and similar to the above influence information, the reconfiguration message is used for indicating whether or not to reconfigure the physical layer during resource configuration. However, during practical application, the manner for the resource configuration message to carry the reconfiguration information can be as follows: a physical layer reconfiguration flag bit is provided in the resource configuration message or a sub-message indicating the physical layer reconfiguration is specially provided, in the resource configuration message and so on furthermore, the manner for the resource configuration message to carry the reconfiguration information can be as follows: an influenced RB resource list is provided in the resource configuration message or it is indicated in the resource configuration message that some fields correspond to different RB resources respectively and these fields are used for indicating whether or not the RB resource is influenced by the resource configuration.

During the particular resource configuration, it may relate to the physical layer reconfiguration, and there may be RB resources influenced by resource configuration, and for different situations, the employed solutions may also be different, and hereinafter, several situations which may exist during resource configuration will be described in detail:

Situation 1: there is no physical layer reconfiguration, and there are RB resources influenced by resource configuration, In this case, during the particular resource configuration, the MAC module only pauses the data transmission borne by the RB resource influenced by the resource configuration. By way of such processing method, the other channel resources unrelated to resource configuration can still be transmitted normally during the particular resource configuration, thus avoiding the waste of RB resources irrelevant to resource configuration during the resource configuration.

Situation 2: there is physical layer reconfiguration, and there are no RB resources influenced by resource configuration.

In this case, during the particular resource configuration, the MAC module pauses the data transmission borne by all the RB resources. By way of such processing method, during the particular resource configuration, when all the RB resources are influenced by resource configuration, it can be ensured that all the RB resources are paused, thus avoiding the influence of resource configuration.

Situation 3: there is physical layer reconfiguration, and there are RB resources influenced by resource configuration.

In this case, the resource configuration process is divided into two stages:

the first stage is the reconfiguration stage of the physical layer, and during this stage, the MAC module pauses the data transmission process borne by all the RB resources; and the second stage is after the reconfiguration of the physical layer at the first stage is successful, and during this stage, the MAC restores the data transmission borne by the RB resource not influenced by the resource configuration, and the RB resource influenced by the resource configuration is still kept in the paused transmission state.

By way of the above processing method, during each stage of the resource configuration, only the data transmission of the RB resource involved during this stage is paused, so that the RB resource can be better utilized, avoiding the waste of channel resources during the resource configuration.

Preferably, in order to ensure that the resource configuration process occurs at the proper time, the above, resource configuration message further carries activation time point information, and when the activation time point indicated by the activation time point information arrives, the MAC module starts up the resource configuration process and only pauses the data transmission borne by the RB resource influenced by the resource configuration.

Preferably, the MAC module receives the resource configuration message sent by the RRC module, the MAC determines which RBs need to be paused according to this resource configuration message, thus different from the related art before sending the resource configuration message, the RRC module has to first send a pause message to the RLC module and PDCP module in layer 2 and also has to send a corresponding restoration message to layer 2 after the configuration is completed, thus reducing the control signaling, simplifying the configuration flow, reducing the processing complexity of the code, and improve the stability of the code.

The following part further describes the above technical solution provided by the embodiments of the present invention by way of a particularly embodiment in the scenario where the UE configures and indicate to hold the Cell-DCH state after receiving the configuration message in the cell dedicated channel (abbreviated as Cell-DCH) state.

In particular, hereinafter, pausing the data transmission of all the RBs during the resource configuration is referred to as limit 1; and only pausing the data transmission of the influenced RB during the resource configuration is referred to as limit 2.

Embodiment I

This embodiment corresponds to the situation 1 above, i.e. the situation in which there is no physical layer reconfiguration and there are RB resources influenced by resource configuration.

Figure 2:
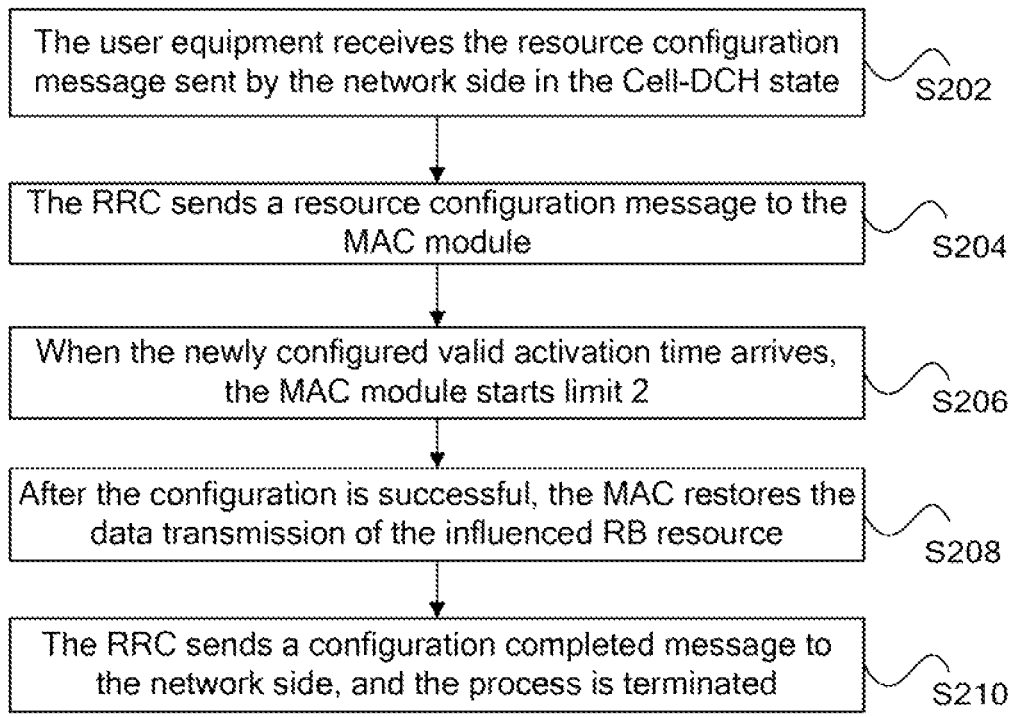
FIG. 2 is a flowchart according to embodiment I of the present invention.

FIG. 2 is a flowchart according to embodiment I of the present invention, and as shown in FIG. 2, in the above situation 1, the method for controlling channel transmission in the present invention mainly includes the following steps (steps S202 to S210):

at step S202, the UE (user equipment) receives the resource configuration message sent by the network side in the state Cell-DCH, wherein the resource configuration message carries a Cctrch reconfiguration message including information about the RB resource influenced by Cctrch resource configuration and not including physical layer information;

at step S204, the RRC at the UE side sends a resource configuration message to the MAC module, wherein the resource configuration message carries: newly configured valid activation time, influenced RB resources and the number thereof, and Cctrch information:

at step S206, when the newly configured valid activation, time arrives, the MAC module determines that there is no physical layer reconfiguration and only the RB resource corresponding to the Cctrch resource is influenced by resource configuration, starts limit 2, and only pauses the influenced RB resource indicated in the configuration resource message; and at step S208, after the configuration is successful, the RLC or PDCP sends a configuration confirmation message to the RRC, and the RRC sends a request message of cancelling limit 2 to the MAC module. Alter receiving this message, the MAC module cancels the limit 2 and restores the data transmission of the influenced RB resource; and at step S210, this RRC sends a configuration completion message to the network side, and after the network side replies with a confirmation message of the completion message, the process is terminated.

By way of the above processing of this embodiment, the channel control during the resource configuration in situation 1 is realized, and this process enables the RB resource not influenced by resource configuration during resource configuration to transmit data normally.

Embodiment II

This embodiment corresponds to the situation 2 above, i.e. the situation where there is physical layer reconfiguration and there are no RB resources influenced by resource configuration.

Figure 3:
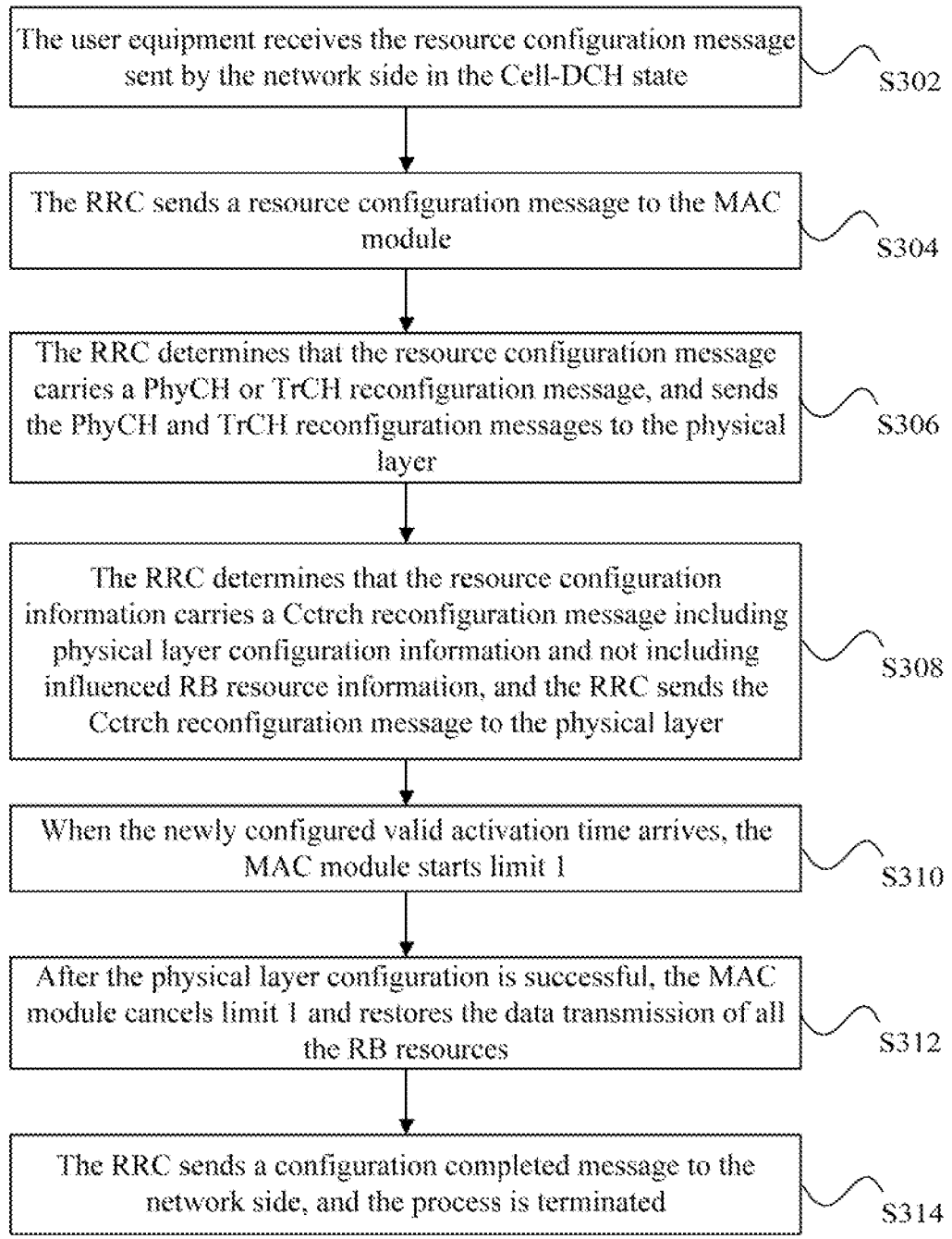
FIG. 3 is a flowchart according to embodiment II of the present invention.

FIG. 3 is a flowchart according to embodiment II of the present invention, and as shown in FIG. 3, in the situation 2 above, the method for controlling channel transmission in the present invention mainly includes the following steps (steps S302 to S314):

at step S302, the UE receives the resource configuration message sent by the network side in the Cell-DCH state;

at step S304, the RRC at the UE side sends resource configuration information to the MAC module, wherein the resource configuration message carries: newly configured valid activation time, influenced RB resources and the number thereof, and Cctrch information;

at step S306, this RRC determines that the resource configuration message carries a PhyCH or TrCH reconfiguration message, and sends the PhyCH and TrCH reconfiguration messages to the physical layer, wherein the reconfiguration message carries: newly configured valid activation time, new PhyCH and TrCH reconfiguration parameters;

at step S308, this RRC determines that the resource configuration information carries a Cctrch reconfiguration message including physical layer configuration information and not including influenced RB resource information, and this RRC sends the Cctrch reconfiguration message to the physical layer, and this reconfiguration message carries new physical layer configuration parameters; and preferably, the parameters relating to the configuration of the physical layer sent to the physical layer in steps S306 and S308 can be stored in the physical layer according to the time order and can also be stored in the physical layer according to the preset priority, and during the resource configuration, the physical layer is reconfigured according to the storage location or storage time of various parameters in the physical layer.

In step S310, when the newly configured valid activation time arrives, the MAC module determines that there is physical layer reconfiguration and starts limit 1;

at step S312, after the configuration of the physical layer is successful, this RRC sends a request message of cancelling limit 1 to the MAC module. After receiving this message, the MAC module cancels limit 1 and restores the data transmission of all the RB resources; and at step S314, this RRC sends a configuration completion message to the network side, and after the network side replies with a confirmation message of the completion message; the process is terminated.

By way of the above processing steps in this embodiment, during the particular resource configuration, when all the RB resources are influenced by resource configuration, it can be ensured that all the RB resources are paused, thus avoiding; the influence of resource configuration.

Embodiment III

This embodiment corresponds to the situation 3 above, i.e. the situation where there is physical layer reconfiguration and there are RB resources influenced by resource configuration.

Figure 4:
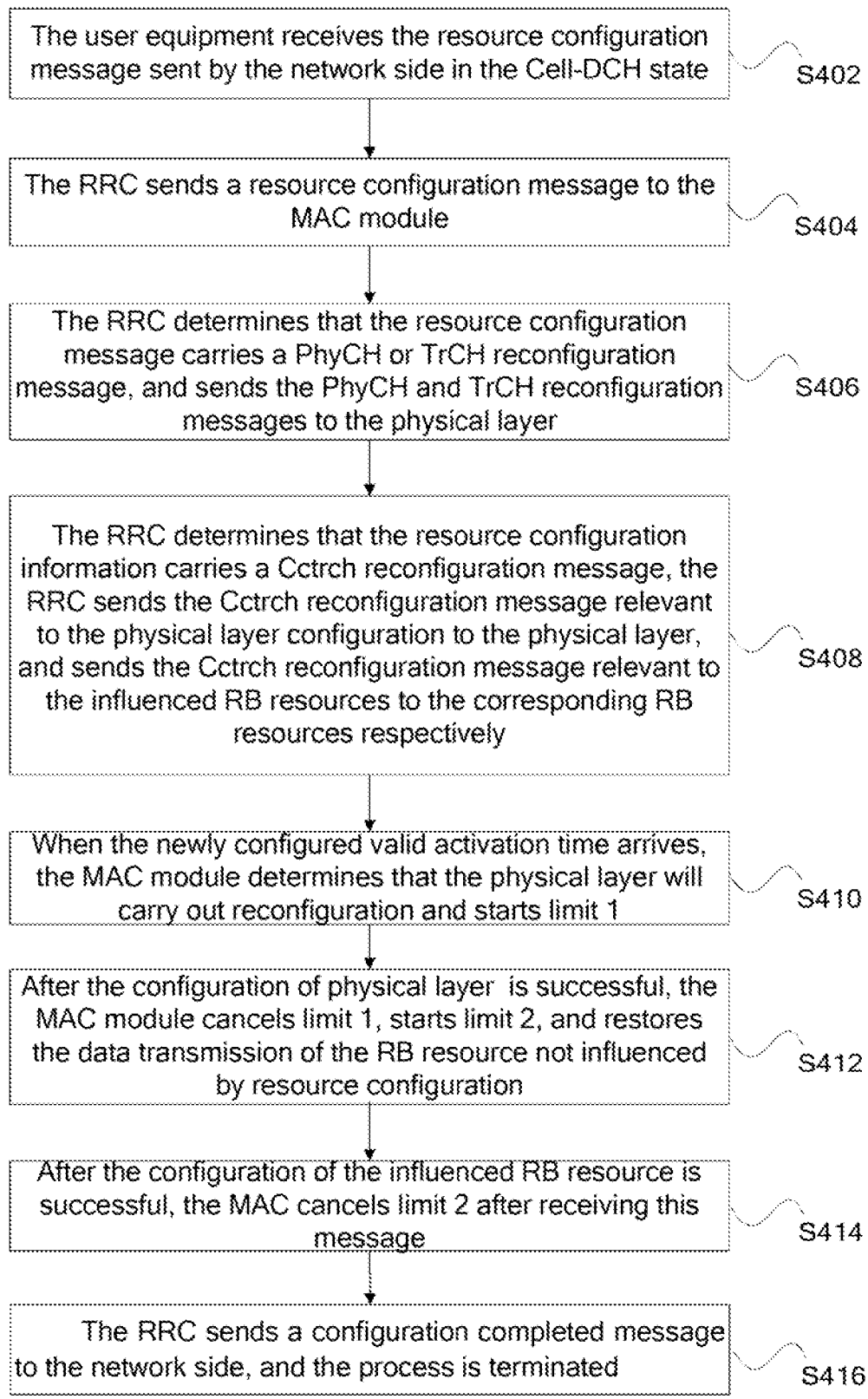
FIG. 4 is a flowchart according to embodiment III of the present invention.

FIG. 4 is flowchart according to embodiment III of the present invention, and as shown in FIG. 4, in the situation 3 above, the method for controlling channel transmission in the present invention mainly includes the following steps:

at step S402, the LIE receives the resource configuration message sent by the network side in the Cell-DCH state;

at step S404, this RRC sends resource configuration information to the MAC module, wherein the resource configuration message carries: newly configured valid activation time, parameters related to the RB resources influenced by resource configuration, and Cctrch information;

at step S406, this RRC determines that the resource configuration information carries a PhyCH or TrCH reconfiguration message, and sends the PhyCH and TrCH reconfiguration messages to the physical layer, wherein the reconfiguration message carries: newly configured valid activation time, new PhyCH and TrCH reconfiguration parameters;

at step S408, this RRC determines that the resource configuration information carries a Cctrch reconfiguration message including physical layer configuration information and influenced RB resource information, the RRC sends the Cctrch reconfiguration message relevant to the physical layer configuration to the physical layer, wherein the reconfiguration message carries new physical layer configuration parameters, and sends the Cctrch reconfiguration message relevant to the influenced RB resources to the corresponding RB resources respectively, and the reconfiguration message carries RB resource configuration parameters; and preferably, the parameters related to the configuration of the physical layer sent to the physical layer in steps S406 and S408 can be stored in the physical layer according to the time order and can also be stored in the physical layer according to the preset priority, and during the resource configuration, the physical layer is reconfigured according to the storage location or storage time of various parameters in the physical layer.

In step S410, when the newly configured valid activation time arrives, the MAC module determines that there is physical layer reconfiguration and starts limit 1;

at step S412, after the configuration of the physical layer is successful, the RRC is notified to send a request message of cancelling limit 1 to the MAC module. After receiving this message, the MAC module cancels limit 1, starts up limit 2, and restores the data transmission of the not influenced RB resources, and the influenced RB resource starts resource configuration;

at step S414, after the configuration of the influenced RB resource is successful, the RLC or PDCP sends a configuration confirmation message to the above RRC, and the RRC sends a request message of cancelling limit 2 to the MAC module. After receiving this message, the MAC module cancels limit 2 and restores the data transmission of the influenced RB resource; and at step S416, the above RRC sends a configuration completion message to the network side, and after the network side replies with a confirmation message of the completion message, the process is terminated.

By way of the above processing in this embodiment, during various stages of the resource configuration, only the data transmission of the RB resource involved during this stage will be paused, so that the RB resource can be better utilized, avoiding the waste of channel resources during the resource configuration.

This embodiment summarizes various situations of the resource configuration, and by way of the processing flow in the present invention, the channel transmission can be rationally controlled in various situations.

The principles of other resource configuration scenarios are the same regarding configuration alignment, which need not be described here.

Figure 5:
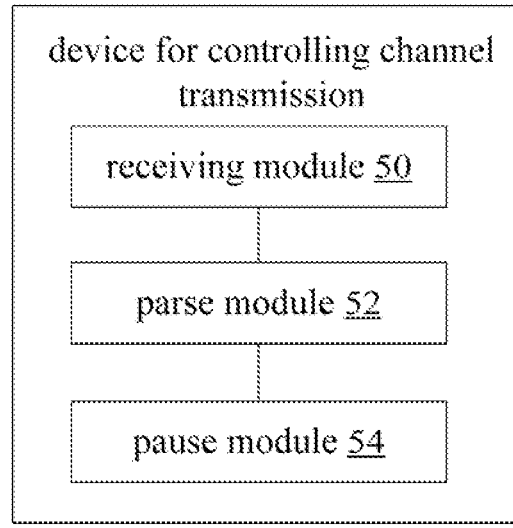
FIG. 5 is a structural block diagram of a device for controlling channel transmission according to the embodiments of the present invention.

FIG. 5 is a structural block diagram of a device for controlling channel transmission according to the embodiments of the present invention, as shown in FIG. 5. The device includes: a receiving module 50, a parse module 52 and a pause module 54, wherein the receiving module 50 is configured to receive a resource configuration message; the parse module 52 is configured to parse influence information from the resource configuration message, the influence information indicating a radio bearer (RB) resource influenced by resource configuration; and the pause module 54 is configured to during the resource configuration, only pause the data transmission borne by the RB resource influenced by the resource configuration.

By way of the device for controlling channel transmission in this embodiment, only the channel transmission related to resource configuration is paused during resource configuration, thus avoiding waste of channel resource irrelevant to resource configuration during resource configuration.

Preferably, the resource information further includes reconfiguration information for indicating whether or not the physical layer is influenced by resource configuration. By way of this information, channel resources related to resource configuration can be conveniently determined.

Figure 6:
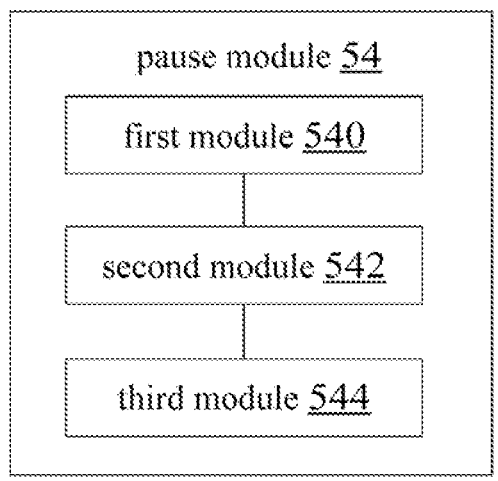
FIG. 6 is a structural block diagram of a pause module in a device for controlling channel transmission according to the embodiments of the present invention.

FIG. 6 is a structural block diagram of a pause module 54 in a device for controlling channel transmission according to the embodiments of the present invention, and as shown in FIG. 6, the pause module 54 includes a first module 540, a second module 542, and a third, module 544. In this case, the first module 540 is configured to, when the reconfiguration information indicates that there is no physical layer reconfiguration and the influence information indicates the RB resource influenced by resource configuration is not null, only pause the data transmission borne by the RB resource influenced by the resource configuration:

the second module 542 is configured to, when the reconfiguration information indicates that there is physical layer reconfiguration and the influence information indicates the RB resource influenced by resource configuration is null, during resource configuration, pause the data transmission borne by all the RB resources; and the third module 544 is configured to, when the reconfiguration information indicates that there is physical layer reconfiguration and the influence information indicates the RB resource influenced by resource configuration is not null, during the physical layer reconfiguration, pause the data transmission borne by all the RB resources; and after the physical layer reconfiguration is successful, restore the data transmission borne by the RB resource not influenced by the resource configuration according to the indication of the influence information.

By way of the three modules in the pause module above, the channel transmission can be controlled rationally during resource configuration in different situations, in particular avoiding waste of channel resource irrelevant to resource configuration during resource configuration.

Figure 7:
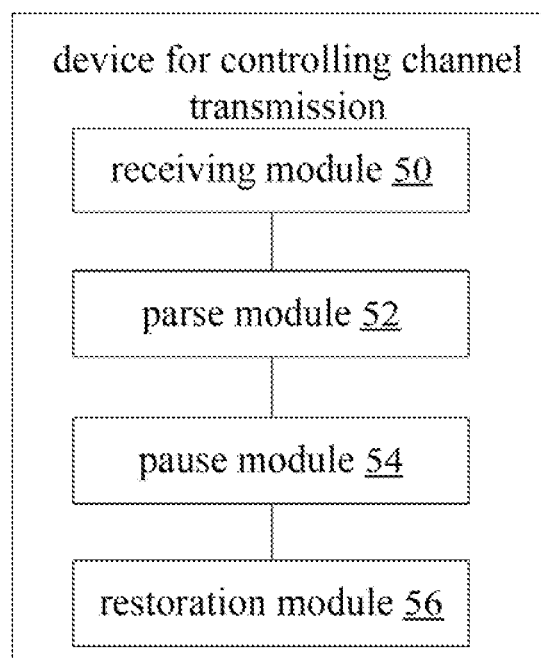
FIG. 7 is a structural block diagram of a device for controlling channel transmission according to the preferred embodiments of the present invention.

FIG. 7 is a structural block diagram of a device for controlling channel transmission according to the embodiments of the present invention, as shown in FIG. 7. The device for controlling channel transmission according to the present invention further includes: a restoration module 56 configured to restore the data transmission borne by the RB resource after the resource configuration is completed. By way of this module, the RB resource influenced by resource configuration can restore data transmission as soon as possible after the resource configuration is completed, avoiding further waste of channel resources.

As compared to the related art, by way of the method provided in the present invention, by only pausing channel resources relevant to resource configuration, those not influenced RB resources can still transmit data normally during configuration, avoiding waste of RB resources relevant to resource configuration during resource configuration; in addition, a control message is directly sent to the MAC module by the RRC, avoiding the pause and start control of the RRC on the RLC entity and PDCP entity, reducing message interaction, greatly simplifying configuration flow, and improving code stability.

Obviously, those skilled in the art should understand that the above module or steps of the present invention can be implemented using a general-purpose computing apparatus, and they can be integrated on a single computing apparatus or distributed over a network consisted of multiple computing apparatus; optionally, they can be implemented using computing apparatus executable program code, thus, they can be stored in a storage for being executed by the computing apparatus, and in some cases, the shown or described steps can be performed in an order different from the order here, or they can be made into various integrated circuit modules respectively, or some modules or steps therein are made into a single integrated circuit module for implementation. In this way, the present invention is not limited to any particular combination of hardware and software.

Above description is only to illustrate the preferred embodiments but not to limit the present invention. Various alternations and changes to the present invention are apparent to those skilled in the art. The scope defined in claims shall comprise any medication, equivalent substitution and improvement within the spirit and principle of the present invention.

What is claimed is:

1. A method for controlling channel transmission, comprising:
   a media access control (MAC) module receiving a resource configuration message;
   the MAC module parsing influence information from the resource configuration message, wherein the influence information indicates a radio bearer (RB) resource influenced by resource configuration; and
   during the resource configuration, the MAC module only pausing data transmission borne by the RB resource influenced by the resource configuration;
   wherein the resource configuration message further comprises reconfiguration information,
      when the reconfiguration information indicates that there is no physical layer reconfiguration and the influence information indicates that the RB resource influenced by the resource configuration is not null, the step of the MAC module only pausing data transmission borne by the RB resource influenced by the resource configuration is executed; or,
      when the reconfiguration information indicates that there is physical layer reconfiguration and the influence information indicates that the RB resource influenced by the resource configuration is null, the MAC module pauses the data transmission borne by all the RB resources during resource configuration; or,
      when the reconfiguration information indicates that there is physical layer reconfiguration and the influence information indicates that the RB resource influenced by the resource configuration is not null, the step of the MAC module only pausing data transmission borne by the RB resource influenced by the resource configuration comprises:
         during the physical layer reconfiguration, the MAC module pausing data transmission borne by all the RB resources; and
         after the physical layer reconfiguration is successful, restoring data transmission borne by a RB resource not influenced by the resource configuration according to the indication of the influence information.

2. The method according to claim 1, wherein the resource configuration message further comprises activation time point information, and when the activation time point arrives, the MAC module only pauses the data transmission of the RB resource influenced by the resource configuration.

3. The method according to claim 2, after the resource configuration is completed, the method further comprising: the MAC module restoring the paused data transmission borne by the RB resource.

4. The method according to claim 2, wherein the MAC module receiving a resource configuration message comprises: the MAC module receiving the resource configuration message sent by a radio resource control (RRC) module.

5. The method according to claim 1, after the resource configuration is completed, the method further comprising: the MAC module restoring the paused data transmission borne by the RB resource.

6. The method according to claim 1, wherein the MAC module receiving a resource configuration message comprises: the MAC module receiving the resource configuration message sent by a radio resource control (RRC) module.

7. The method according to claim 1, wherein the MAC module receiving a resource configuration message comprises: the MAC module receiving the resource configuration message sent by a radio resource control (RRC) module.

8. A device for controlling channel transmission, comprising:
   a receiving module configured to receive a resource configuration message;
   a parse module configured to parse influence information from the resource configuration message, the influence information indicating a radio bearer (RB) resource influenced by resource configuration; and
   a pause module configured to, during the resource configuration, only pause data transmission borne by the RB resource influenced by the resource configuration;
   wherein the resource configuration message further comprises reconfiguration information, and the pause module comprises:
   a first module configured to, when the reconfiguration information indicates that there is no physical layer reconfiguration and the influence information indicates the RB resource influenced by resource configuration is not null, only pause the data transmission borne by the RB resource influenced by the resource configuration;
   a second module configured to, when the reconfiguration information indicates that there is physical layer reconfiguration and the influence information indicates the RB resource influenced by resource configuration is null, pause the data transmission borne by all the RB resources during resource configuration; and
   a third module configured to, when the reconfiguration information indicates that there is physical layer reconfiguration and the influence information indicates the RB resource influenced by resource configuration is not null, pause the data transmission borne by all the RB resources during the physical layer reconfiguration; and after the physical layer reconfiguration is successful, restore data transmission borne by a RB resource not influenced by the resource configuration according to the indication of the influence information.

9. The device according to claim 8, further comprising: a restoration module configured to restore data transmission borne by the RB resource after the resource configuration is completed.

* * * * *